United States Patent [19]

Liu et al.

[11] Patent Number: 4,821,224

[45] Date of Patent: Apr. 11, 1989

[54] METHOD AND APPARATUS FOR PROCESSING MULTI-DIMENSIONAL DATA TO OBTAIN A FOURIER TRANSFORM

[75] Inventors: Wentai Liu, Cary; William T. Krakow, Chapel Hill; Thomas A. Hughes, Jr., Raleigh, all of N.C.

[73] Assignees: Microelectronics Center of N.C., Research Triangle Park; N.C. State University, Raleigh, both of N.C.

[21] Appl. No.: 926,436

[22] Filed: Nov. 3, 1986

[51] Int. Cl.$^4$ .................................. G06F 15/332
[52] U.S. Cl. .................................................. 364/726
[58] Field of Search ...................................... 364/726

[56] References Cited

U.S. PATENT DOCUMENTS

| | | | |
|---|---|---|---|
| 3,584,782 | 6/1971 | Bergland | 364/726 |
| 3,662,161 | 5/1972 | Bergland et al. | 364/726 |
| 3,777,131 | 12/1973 | Llewellyn | 364/726 |
| 3,952,186 | 4/1976 | Speiser et al. | 364/726 |
| 4,092,723 | 5/1978 | Picquendar et al. | 364/726 |
| 4,158,888 | 6/1979 | Shapiro et al. | 364/726 |
| 4,159,528 | 6/1979 | Perry | 364/726 |
| 4,231,102 | 10/1980 | Barr et al. | 364/726 |
| 4,231,103 | 10/1980 | Timm | 364/726 |
| 4,241,411 | 12/1980 | Krasner et al. | 364/726 |
| 4,298,950 | 11/1981 | Smith, Jr. | 364/726 |
| 4,328,555 | 5/1982 | Nussbaumer | 364/726 |
| 4,344,151 | 8/1982 | White | 364/754 |
| 4,601,006 | 7/1986 | Liu | 364/726 |

OTHER PUBLICATIONS

Rabiner et al., "Theory and Application of Digital Signal Processing," 1975, pp. 573–626.
Siegel, "*Image Processing on a Partitionable SIMD Machine*" in "Languages and Architectures for Image Processing" by Duff et al. Ed. Academic Press, 1981, pp. 293–300.
G. Rivard, "Direct Fast Fourier Transform of Bivariant Functions", IEEE Trans. Accoustic, Speech, Signal Processing, vol. ASSP-25, pp. 250–252, Jun. 1977.
Cooley et al., "An Algorithm for the Machine Computation of Complex Fourier Series," Mathematical Computation, vol. 19, pp. 297–301, Apr. 1965.
Eklundh, "Efficient Matrix Transposition", in Two-Dimensional Digital Signal Processing II, T. Huang, Ed Springer-Verlag, pp. 9–35, 1981.
Liu et al., "VLSI Pipelined Architectures for Two Dimensional FFT With Raster-Scan Input Device," Int'l Conference on Computer Design: VLSI in Computer (ICCD84), pp. 370–375, Oct. 1984.
Groginsky et al., "A Pipeline Fast Fourier Transform," IEEE Trans. Computers, vol. C-19, No. 11, pp. 1015–1019, Nov. 1970.
Joshi et al., "A Vidio Rate Two Dimensional FFT Processor" ICASSP 80 Proceedings IEEE International Conference on Acoustics, Speech & Signal Processing, Denver, Col. Apr. 9–11, 1980, pp. 774–777.

Primary Examiner—Gary V. Harkcom
Assistant Examiner—Tan V. Mai
Attorney, Agent, or Firm—Bell, Seltzer, Park & Gibson

[57] ABSTRACT

A method and apparatus for rasterizing a two-dimensional fast Fourier transform of a size N×N using a pipelined butterfly computational unit with 2logN processors. The invention avoids the problems associated with transposing the matrix so that the data can be continuously driven into the arithmetic processors in a pipelined fashion. It is devised for realtime applications using raster scan or serial input and output devices.

27 Claims, 6 Drawing Sheets

$$\begin{bmatrix} X_{00} & X_{10} & X_{20} & X_{30} \\ X_{01} & X_{11} & X_{21} & X_{31} \\ X_{02} & X_{12} & X_{22} & X_{32} \\ X_{03} & X_{13} & X_{23} & X_{33} \end{bmatrix}$$

$\begin{Bmatrix} X_{00} \\ X_{10} \\ X_{20} \\ X_{30} \\ X_{01} \\ X_{11} \\ X_{21} \\ X_{31} \\ X_{02} \\ X_{12} \\ X_{22} \\ X_{32} \\ X_{03} \\ X_{13} \\ X_{23} \\ X_{33} \end{Bmatrix}$

CYCLE 1
(Read)

FIG-11A

CYCLE 2
(Write)

METHOD AND APPARATUS FOR PROCESSING MULTI-DIMENSIONAL DATA TO OBTAIN A FOURIER TRANSFORM

FIELD OF THE INVENTION

This invention relates generally to generating Fourier transforms of data, and outputting the transformed data in serial or raster format.

BACKGROUND OF THE INVENTION

The two-dimensional Discrete Fourier Transform is defined as follows:

$$X(k_1,k_2) = \sum_{n_1=0}^{N-1} \sum_{n_2=0}^{N-1} x(n_1,n_2) W_N^{n_1k_1} W_N^{n_2k_2} \quad (1)$$

This transform is generally evaluated either by the classical row-column method (radix-2 method) or by the vector radix method.

Many applications of digital signal processing require the evaluation of discrete Fourier transforms (DFT's) of multidimensional sequences. The case of two-dimensional discrete Fourier transforms has been widely applied in the area of filtering, image enhancement, image coding, image compression and restoration, radar detection, computerized tomography, nuclear magnetic resonance (NMR) tomography and seismic analysis.

Since the apperance of the original Cooley-Tukey method in 1965, the standard methods of computing the two-dimensional discrete Fourier transform have been governed by the separability of two-dimensional DFT. Two-dimensional Fourier transform has been decomposed into two one-dimensional DFT by using the one-dimensional fast Fourier Transform (FFT) to execute the transform either in row-column-wise or in column-row-wise format.

Matrix transposition and high input/output bandwidth are two major problems associated with the use of a row-column (or column-row) method for the two-dimensional DFT. Therefore techniques to efficiently store the data in a secondary storage device such that it can avoid matrix transposition or minimize the traffic between the main memory and secondary memory, as done by the present invention, are very crucial in the execution of the FFT.

Figure 1:
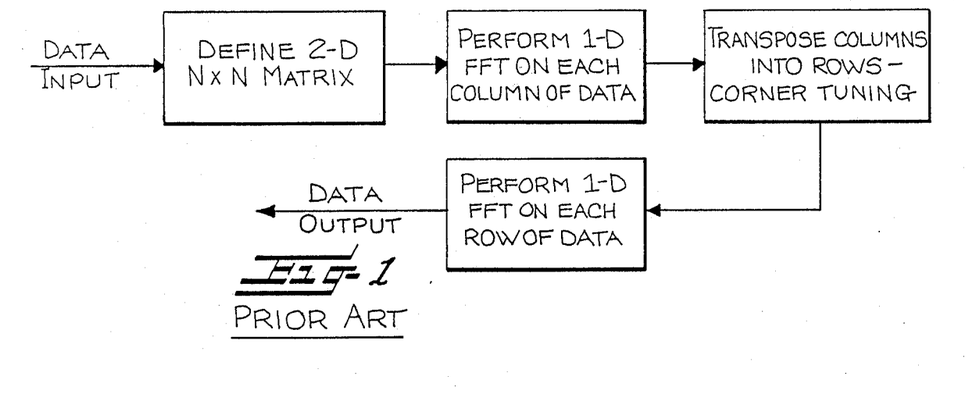
FIG. 1 is a block diagram of the prior art illustrating how data was processed to obtain Fourier transforms of two-dimensional data, requiring the transposition of data in columns into rows.

In prior art applications the matrix is stored on a mass storage device, e.g. a disk or a tape, where the smallest record that can be easily accessed is either an entire row or column. The way in which the data is stored facilitates data access for one-dimension but impedes data access of another dimension. The decomposition of each row (column) to transpose it into a column (row) severely degrades the performance of the implementation of a two-dimensional FFT either in conventional machines, especially virtual memory machines or Single Instruction Multiple Data (SIMD) machines. Even efficient matrix transposition algorithms pose serious bottlenecks for most super vector machines in performing vector gathering operations. In the prior art, the matrix transposition problem was eased by employing a staging memory proposed between the memory and the processor. The staging memory can reformat or corner-tune the array of data, making it compatible with the fast Fourier transform unit. See. FIG. 1.

For example, the naive or direct method for computing the one-dimensional DFT in Equation (1) required $N^2$ multiplications. However the one-dimensional fast Fourier transform (1—D FFT) is a method to reduce the requirement to (N log N) multiplications. Methods for the 1—D FFT can be classified into full parallel, iterative parallel, cascade, and scalar structure. Computational tasks involving two-dimensional discrete Fourier transforms are computationally intensive and need a very high input-output bandwidth. SIMD machines have been proposed to map the row-column-wise decomposition (radix-2 method) of a two-dimensional fast Fourier transform (2DFFT). Array processors with radix-2 methods for 2DFFT using the corner-tuning mechanism have been proposed. Pipelined processors with vector radix-2×2 for 2DFFT have also been proposed. There is a need to have a highly efficient architecture for 2DFFT, especially in the environment of raster-scan or serial input/output devices.

Accordingly it is an object of the present invention to provide a method and apparatus for processing data to obtain a Fourier transform of data presented in a multi-dimensional format.

It is a further object of the present invention to provide a method and apparatus for processing data to obtain a Fourier transform of data presented in a two-dimensional matrix using the data from the matrix for the transformation without the necessity of transposing the matrix.

It is a further object of the present invention to provide a method and apparatus for processing data to obtain a Fourier transform of data presented in a two-dimensional matrix, and drive the arithmetic processors in a pipelined fashion.

It is a further object of the present invention to provide a method and apparatus for processing data to obtain a Fourier transform of data presented in a two-dimensional format using input and output devices that transmit data serially, or in raster scan manner.

These and other objects of the invention will become clear to those having the benefit of this disclosure.

SUMMARY OF THE INVENTION

The method and apparatus of the present invention relate to obtaining a Fourier transform of data presented in a multi-dimensional format. An N×N matrix of data is defined, and the data from each column of the matrix is rasterized into a serial string of data. A Fourier transform is performed on the string of data. Another Fourier transform is performed on the string of data.

The invention may be used with raster scan or serial input-output devices. It operates very efficiently and may be implemented using only the radix-2 method without using a corner-tuning mechanism or matrix transposition mechanism to convert rows (columns) into columns (rows). Thus, the invention may meet real time application requirements, and may be implemented using fewer components.

DESCRIPTION OF THE INVENTION

In this section, the operation of the pipelined 2DFFT is explained in terms of both the Sande-Tukey method (Decimation-in-Frequency) and the Cooley-Tukey method (Decimation-in-Time) for one-dimensional FFT. Flow graphs for a two-dimensional transform are generated. Based on the flow graph, rasterization of the two-dimensional transform becomes possible, permitting use of the one-dimensional method without a transposition of the data.

Figure 2:
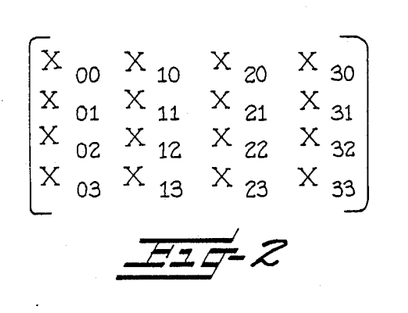
FIG. 2 is a schematic diagram of how data may be stored in a two-dimensional matrix.
Figure 3:
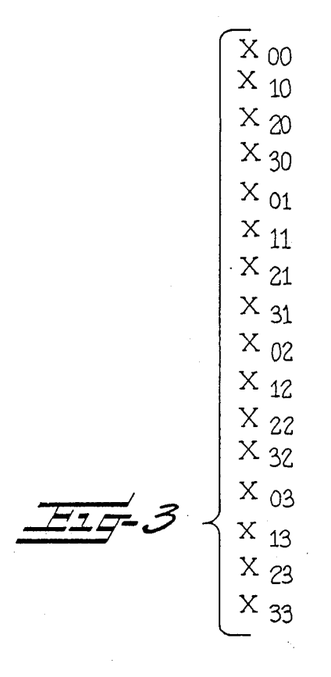
FIG. 3 is a schematic diagram of how the data in the two-dimensional matrix of FIG. 2 is merged into a one-dimensional column.
Figure 4:
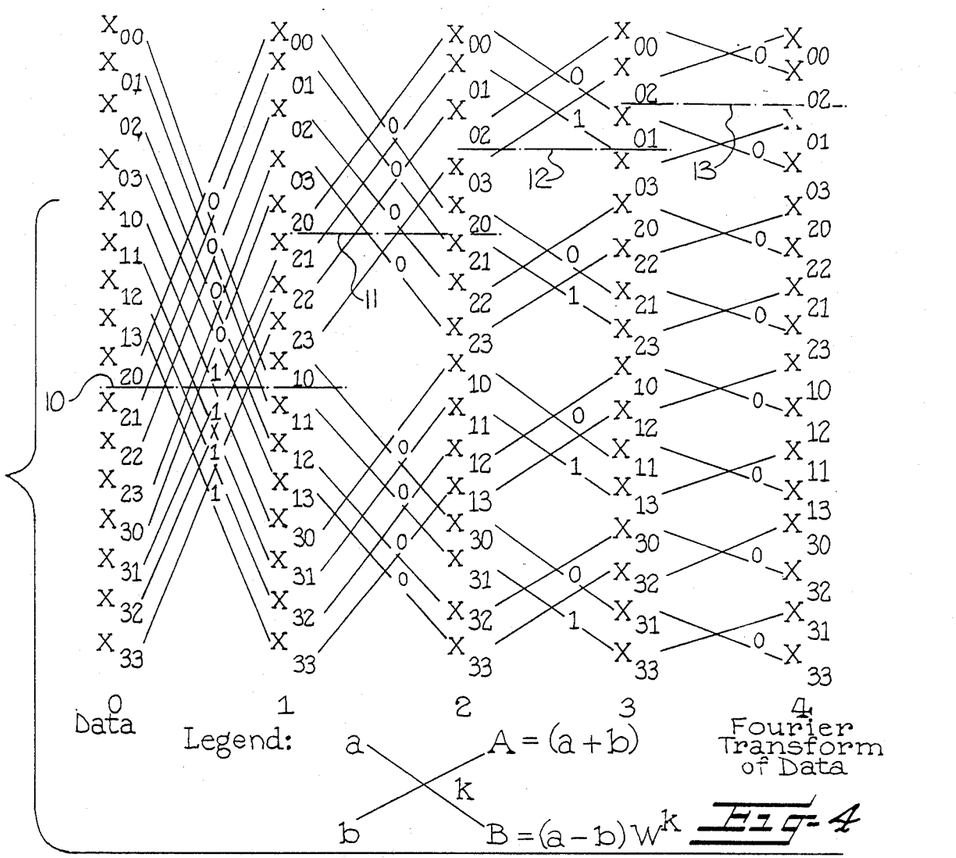
FIG. 4 is a schematic diagram for a decimation-in-frequency flow chart for a two-dimensional Fourier transform, including a legend illustrating the butterfly computational unit.
Figure 6:
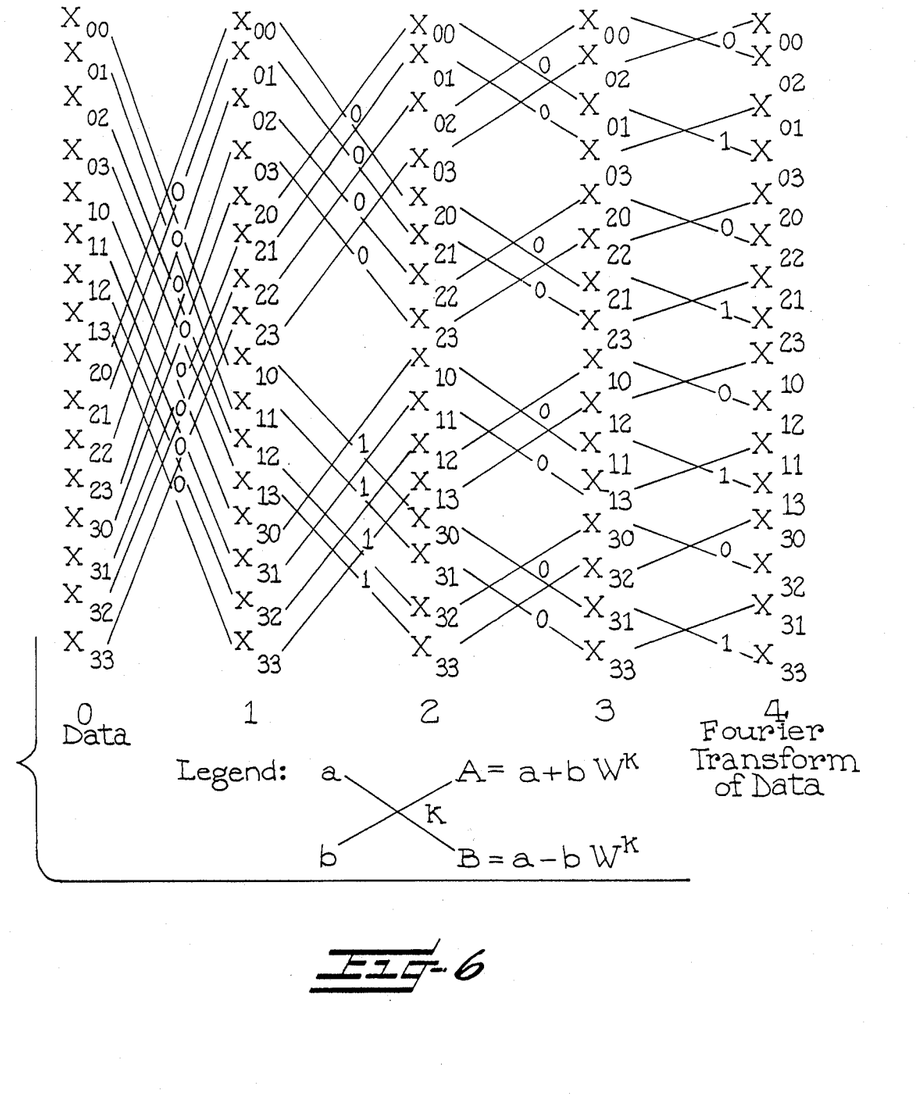
FIG. 6 is a schematic diagram for a decimation-in-time flow chart for a two-dimensional Fourier transform, including a legend illustrating the butterfly computational unit.
Figure 7:
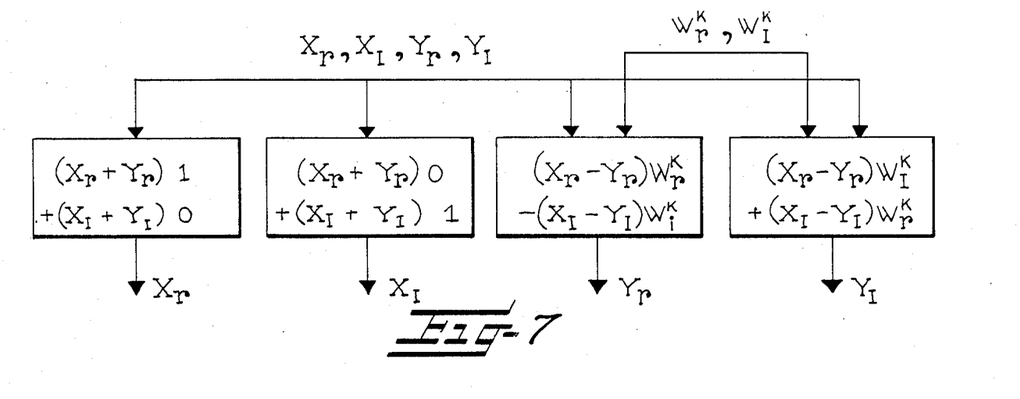
FIG. 7 is a schematic block diagram illustrating one embodiment of the partitioning used to implement the present invention using VLSI technology.

All of the one-dimensional column data of FIG. 2 is illustrated merged into a single column 0 of the FIGS. 4 and 6. A similar merger of all of the one-dimensional rows of data of FIG. 2 into a single column is illustrated in FIG. 3. This is equivalent to concatenating the two-dimensional input data into one-dimensional data according to the serial or raster-scan order such that the butterfly operations (every column or every row) can be executed in parallel.

Every column of data of FIGS. 4 and 6 consists of 2logN stages labelled 0,1,2,3,4 in the conventional flow graph. At the first stage, stage 0, the transformation examines the data points displaced by half the data length $N^2/2$ (see line 10); at the second stage, stage 1, it examines the data points displaced by one quarter of the data length $N^2/4$, (see line 11); at the third stage, stage 2, it examines the data points displaced by one eighth of the data length $N^2/8$, (see line 12); until the last stage, stage 4, (logN's) where it examines the data points displaced by 1 (see line 13). The displacement at stage i is $N^2/2^i$. The transformation performs the butterfly operations as illustrated in the legends for FIGS. 4 and 6. A flow graph for a two-dimensional transform is made by merging all the one-dimensional column transformational flow graphs together at each stage and there are logN one-dimensional stages for every column transform. The first logN stages are devised to perform one-dimensional transformation for all N columns of data.

At the first stage, the transformation examines the data points displaced by $N^2/2$, the second $N^2/4$, ..., until the 2logN's stage by N. The displacement at any stage between 1 and logN is $N^2/2^i$. The one-dimensional transformations for all N rows of data starts at the stage logN +1 and ends at the stage 2logN. At stage logN +1, the transformation examines the data points displaced by $N^2/2^i$ ..., until at stage 2logN it examines the data points displaced by 1.

At the same stage, all the operations associated with rows/columns can be operated in paralle. It takes logN stages for each transformation. In total, it takes 2logN stages for a 2DFFT transformation. Each stage needs only the data generated from the preceding stage. The output appears in the two-dimensional bit-reversal order. This makes the flow graph for a two-dimensional FFT appear as the one shown in the FIG. 4. A validation of the flow graph can be provided by the following:

$$X_{01} = x_{01} \quad (4)$$

$$= x_{01}^{(3)} + x_{03}^{(3)}$$

$$= (x_{00}^{(2)} - x_{02}^{(2)}) + (x_{01}^{(2)} - x_{03}^{(2)})W$$

$$= \left( [(x_{00}^{(1)} + x_{20}^{(1)}) - (x_{02}^{(1)} + x_{22}^{(1)})] + [a(x_{01}^{(1)} + x_{21}^{(1)}) - (x_{03}^{(1)} + x_{23}^{(1)})]W \right)$$

$$= \left( [(x_{00}^{(0)} + x_{20}^{(0)}) + (x_{10}^{(0)} + x_{30}^{(0)})] - [(x_{02}^{(0)} + x_{22}^{(0)}) + (x_{12}^{(0)} + x_{32}^{(0)})] \right)$$

$$+ \left( [(x_{01}^{(0)} + x_{21}^{(0)}) + (x_{11}^{(0)} + x_{31}^{(0)})] - [(x_{03}^{(0)} + x_{23}^{(0)}) + (x_{13}^{(0)} + x_{33}^{(0)})] \right) W$$

Figure 5:
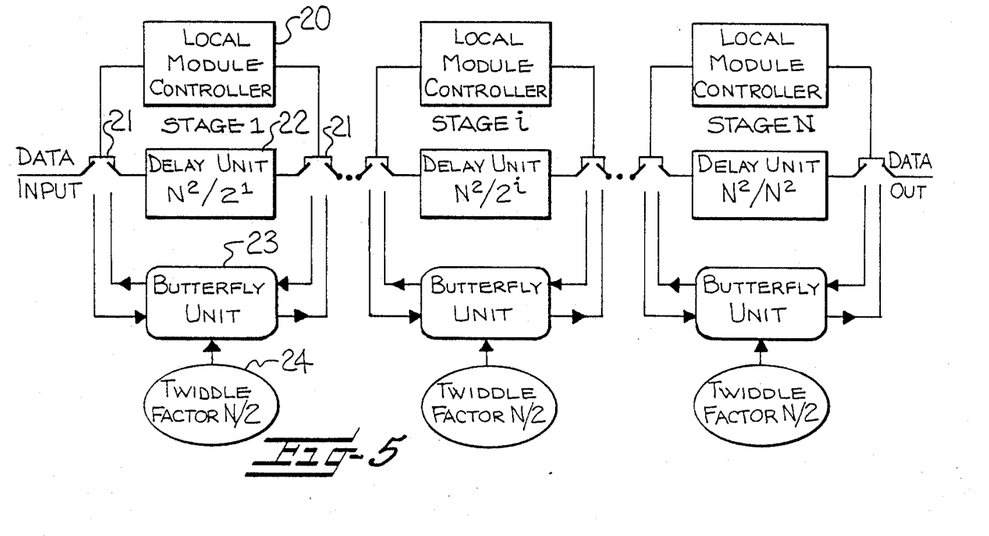
FIG. 5 is a schematic block diagram for a serial, two-dimensional Fourier transform data processor having 2logN stages.
Figure 13:
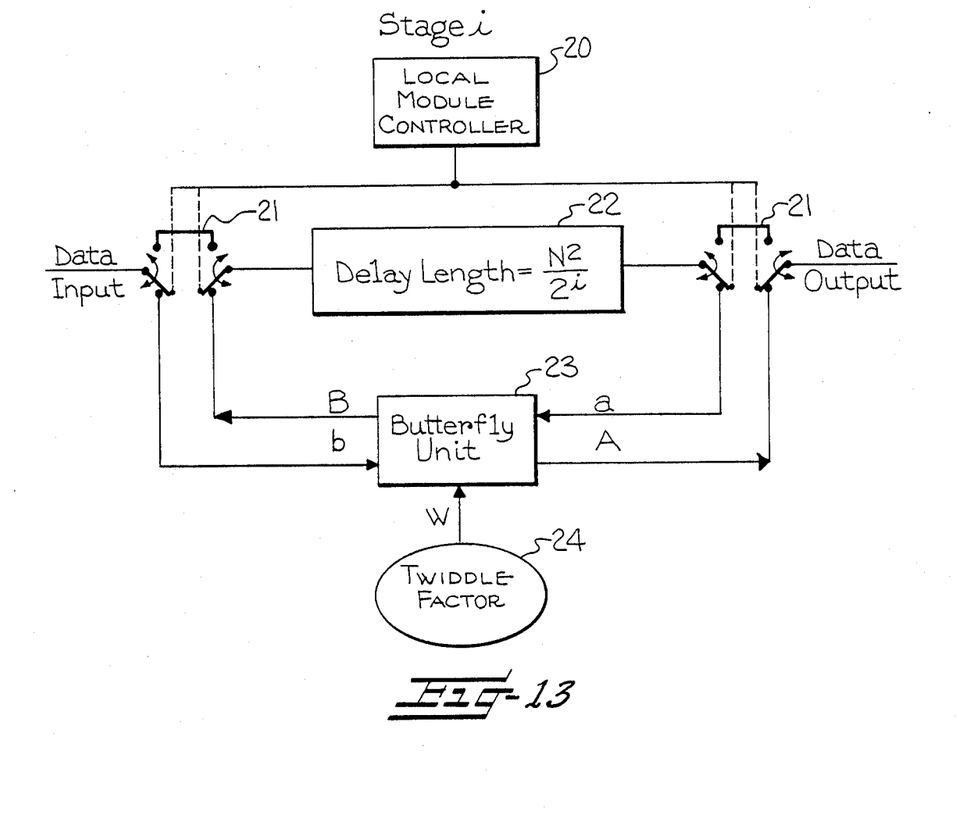
FIG. 13 is a schematic block diagram of one stage of the data processor, illustrating the data flow paths.

Each of the stages may be realized with a basic module or component whose general form is shown in FIGS. 5 and 13. Any module or stage i (which includes a local module controller, delay unit, butterfly unit, and twiddle factor generator) alternatively transfers blocks of $2^i$ data samples into the delay line or into the arithmetic unit. When the data just fills the delay line, the arithmetic unit obtains a twiddle factor W and begins its operation. The next block of $2^i$ input data samples are sent to the arithmetic unit that now produces two complex outputs in response to the two complex inputs it receives. One of the outputs is immediately transferred to the next stage while the other output is sent to the delay line. During the interim period when the delay line is filled with fresh input data, the contents of the line containing the results of processing the earlier blocks are transferred to the next stage. The butterfly or arithmetic unit computes the complex two-poiont transform shown in the lengths for FIGS. 4 and 6.

The module may be assembled into a system for computing 2DFFT with the size of NxN samples. The system consisting of 2logN stages is shown in FIG. 5, and comprises stage 1, ..., stage i, ..., stage 2logN. FIG. 1 shows that at most $N/2^i$ twiddle factors need to be supplied in the pipedlined processor.

Similarly, the flow graph based on the Cooley-Tukey method can be derived. The output is also in the two-dimensional bit-reversal order in FIG. 6.

Table 1 shows the minimal computational requirement for the real-time applications of the invention with respect to the proposed apparatus. The requirements are expressed in terms of maximal computation time in each pipelined stage, number of pipelined stages, and number of multipliers per pipelined stage. For example, the real-time application is operated in the environment of a TV frame rate with 30 frames per second.

TABLE 1

Computational Requirements for Real-Time Applications (Radix-2)

| Image Size | Maximal Computation Time/Pipelined Stage | Number of Pipelined Stages | Number of Multipliers/ Stage |
|---|---|---|---|
| 128 × 128 | 2034.5 ns | 14 | 1 |
| 256 × 256 | 508.6 ns | 16 | 1 |
| 512 × 512 | 127.2 ns | 18 | 1 |
| 1024 × 1024 | 31.8 ns | 20 | 1 |
| 2048 × 2048 | 7.9 ns | 22 | 1 |
| 4096 × 4096 | 2.0 ns | 24 | 1 |
| 8192 × 8192 | .5 ns | 26 | 1 |

The requirement can be relaxed if a vector radix 2×2 algorithm is used in the pipelined processor. This is shown in Table 2. Table 1 and Table 2 show the trade-off between space and time for various methods to implement 2DFFT. More relaxed constraints can be obtained if an iteratively parallel method is adopted. This is shown in Table 3.

TABLE 2

Computational Requirements for Real-time Applications (Radix 2 × 2)

| Image Size | Maximal Computation Time/Pipelined Stage | Number of Pipelined Stages | Number of Multipliers/ Stage |
|---|---|---|---|
| 128 × 128 | 8138.0 ns | 7 | 3 |
| 256 × 256 | 2034.4 ns | 8 | 3 |
| 512 × 512 | 508.8 ns | 9 | 3 |
| 1024 × 1024 | 127.2 ns | 10 | 3 |
| 2048 × 2048 | 31.6 ns | 11 | 3 |
| 4096 × 4096 | 8.0 ns | 12 | 3 |
| 8192 × 8192 | 2.0 ns | 13 | 3 |

TABLE 3

Computational Requirements for Real-time Applications (Iterative Radix 2 × 2)

| Image Size | Maximal Allowed Computation Time/Pipelined Stage (microseconds) | Number of Pipelined Stages | Number of ALU per Iterative Stage | Number of Multiplier/ Stage |
|---|---|---|---|---|
| 128 × 128 | 520.8 | 7 | 64 | 3 |
| 256 × 256 | 260.4 | 8 | 128 | 3 |
| 512 × 512 | 130.2 | 9 | 256 | 3 |
| 1024 × 1024 | 65.1 | 10 | 512 | 3 |
| 2048 × 2048 | 32.3 | 11 | 1024 | 3 |
| 4096 × 4096 | 16.3 | 12 | 2048 | 3 |
| 8192 × 8192 | 8.1 | 13 | 4096 | 3 |

Word length of data is an additional consideration of computation requirements. Table 4 gives the word length necessary at different image sizes to maintain errors below 2% in a fixed point system. Word length is defined with length (real)=length (imaginary).

| Image Size | Word length(bits) | Error (%) |
|---|---|---|
| 128 × 128 | 9 | 1.9 |
| 256 × 256 | 10 | 1.3 |
| 512 × 512 | 11 | 1.9 |
| 1024 × 1024 | 12 | 1.3 |

Table 4 (below) FIG. 5 illustrates a pipelined two-dimensional fast Fourier processor comprised of discrete modules. Each module includes a local module controller 20, input and output data swithes 21 to the delay unit controlled by the module controller 20, a delay unit 22, a butterfly computational unit 23, and a twiddle factor generator 24.

The butterfly unit (BU) 23 performs the complex operation shown in the legends of FIGS. 4 and 6. Using, by way of example, an image size of 256×256 and the Radix-2 method, which yields a 508.6 ns cycle time, the total number of real-number (not complex-number) operations to be performed on this data in about 500 ns are four multiplies and eight additions or subtractions. For the target technology of MOSIS's 3 micron scalable CMOS, some decomposition of the apparatus into several chips may be necessary or desirable.

Figure 8A:
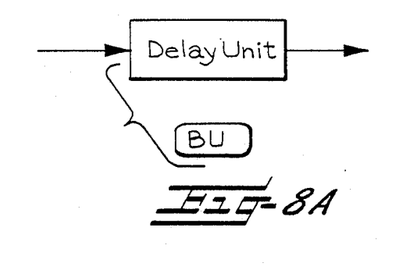
FIGS. 8A-8B are schematic block diagrams illustrating the flow of data without pipelined butterfly unit.
Figure 8B:
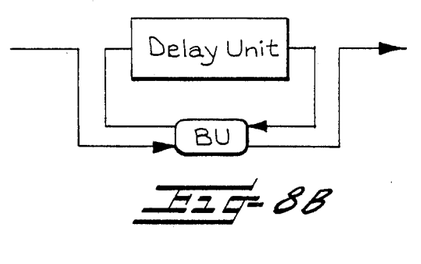

FIG. 8 is an example of the partitioning that may be used for CMOS implementation of the invention. Two chips have some redundant functions but the advantage to a VLSI implementation is uniformity. A custom chip design using Berkley's Magic has been implemented. The design may use 1.25 micron CMOS technology. A 3 micron CMOS version using GE CMOS technology has also been implemented. It includes 132 input/output, 4881 2-input NAND gates, and 2 pipeline stages. It utilizes an 8 MHZ clock rate and its size is 260×272 mils.

This system may accommodate future growth to designs of frame images larger than 256×256 and higher speeds. Butterfly chips use a pipelining mechanism, not essential to compute the function in 500 ns, but to handle pipelined butterfly units as may be needed in future designs.

Figure 9A:
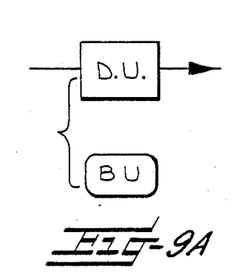
FIGS. 9A-9D are schematic block diagrams illustrating the flow of data with a pipelined butterfly unit.
Figure 9B:
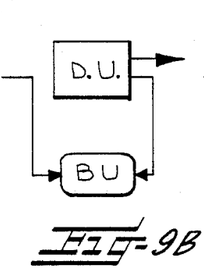
Figure 9C:
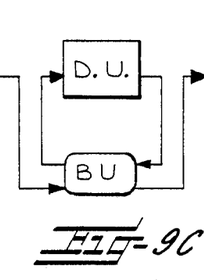
Figure 9D:
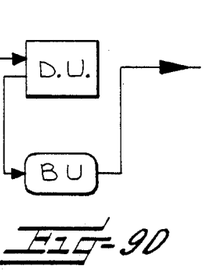

The data flow possible from the delay unit (DU) 22 and switch 21 of FIG. 5 are shown in FIGS. 8A and 8B. In FIG. 8A, with the data switches 21 in the upper position shown in FIG. 5, the data moves into the delay unit and, after a predetermined delay, is output directly to the next stage. In FIG. 8B, with the data switches 21 in the lower positions, as shown in FIG. 13, the data moves to the butterfly unit. This is for the case where the butterfly unit is not pipelined. If, however, the butterfly unit is to be pipelined, then other data flows occur. For the cases of the pipeline length of a butterfly unit less than or greater than the delay length of the delay unit, the four data flows of FIGS. 9A-9D occur. If the pipe length of the butterfly unit is equal to the delay unit's delay length, then only data flows in FIGS. 9B and 9D occur.

In operation, referring to FIGS. 5 and 13, the two-dimensional data, in this example a 4×4 matrix, is arranged in raster-scan order, as shown in column 0 of FIG. 4. The data is supplied to the data input of FIG. 5 in serial or raster scan order, beginning with $X_{00}$. The local module controller 20 control both switches 21 on either side of the delay unit 22 so that both of them are simultaneously either in the up position connecting the data input to the delay unit and the delay unit to the succeeding stage (via the data output), as shown in FIG. 5; or in the down position connecting the data input to the butterfly unit 23, the butterfly unit to the input of the delay unit 22, the output of the delay unit to the butterfly unit, and the output of the butterfly unit to the succeeding stage, as shown in FIG. 13. Taking the operations of switches 21 as an example, the data input is sequentially fed the sixteen data values $X_{00} - X_{33}$, shown in column 0 of FIG. 4. The switches 21 are initially positioned as shown in FIG. 5 and the data flows sequentially into a pipeline delay unit 22, such as a clocked shift register, having a delay of $N^2/2^i$ data words. Assuming N=4, for a 4×4 matrix, there are four stages of modules, with the delay being $4^2/2^1=8$ data words for the first stage (i=1). Thus, the first eight data words fill the delay unit. The input and output data switches 21 are then switched to their down position, illustrated in FIG. 13, allowing $X_{00}$ from the delay unit 22 to flow as an input a into the butterfly unit 23. The input switches 21 simultaneously direct the ninth data element ($X_{20}$) on the data input line into the butterfly unit 23 as an input b. As explained with reference to FIGS. 4 and 6, the butterfly unit performs the addition (a+b) and the subtraction (a−b). The twiddle factor generator 24 provides the correct twiddle factor $W^k$ to the butterfly unit. The butterfly unit 23 then performs the transformations A=(a+b) and B=(a−b) $W^k$ and puts the results A and B on the output data lines illustrated in FIG. 13 to complete the first pair of data of the first pass of the transformation.

In the second switched positions of switches 21, shown in FIG. 13, the data output A of the butterfly unit is immediately available on the data output lines to form the data input to the next stage, as shown in FIG. 5, while the data output B of the butterfly unit is clocked into the delay unit 22. It is delayed by eight data words, after which the switches 21 are switched back to their upper or first position, as shown in FIG. 5, to receive a new set of rasterized two-dimensional data. For a 4×4 matrix and a four stage system, the data is clocked into the first module over sixteen data words, and after a delay of eight data words, is clocked out over sixteen data words. The switches 21 at the first stage are switched between the first and second position every eight data words.

The transformed intermediate data is then clocked to the second stage. The second stage switches operate in a manner similar to the first stage, with the delay period new being four words. Likewise, the third stage switching elements operate in a manner similar to the first and second stage switching arrangements to perform third pass transformations, using a delay period of two words. The fourth stage operates in a similar manner to perform the fourth stage transformations, and operates with a delay period of one word.

Figure 10:
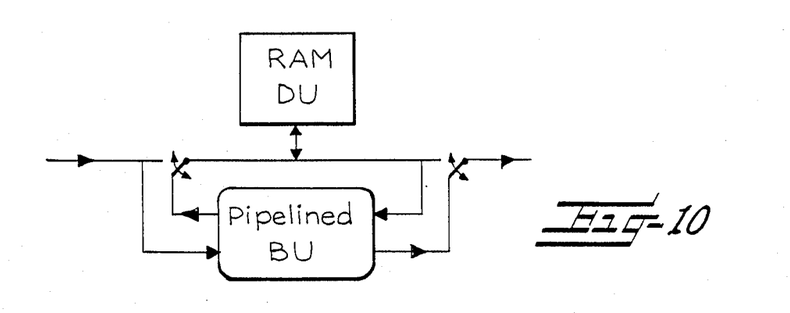
FIG. 10 is a schematic block diagram illustrating a RAM delay unit, data switch and pipelined butterfly unit.
Figure 11A:
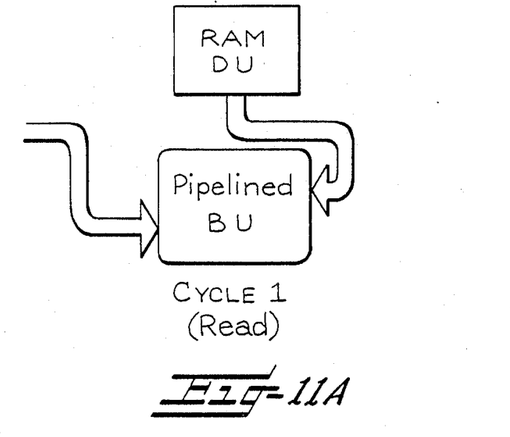
FIG. 11A and 11B are schematic block diagrams illustrating the data flow paths for the read and write cycles for a two cycle RAM delay unit.
Figure 11B:
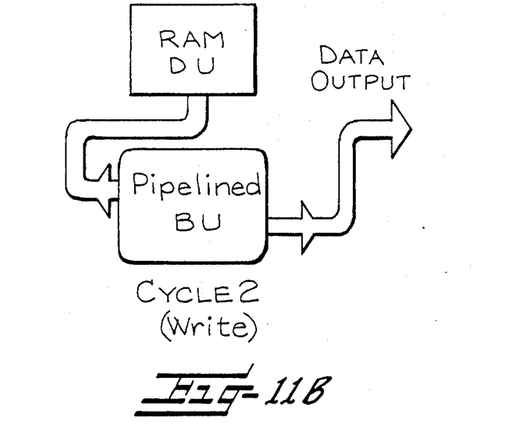

For the case of 256×256, the largest delay length is $N^2/2 =32K$ or half a frame buffer. However due to pipelining of the butterfly unit, the delay length needs to be ($N^2/2$ +BU pipe length). The idealized delay unit could be a simple shift register delay, but the data flows of FIGS. 8 and 9, and the size of ($N^2/2$ +BU's pipe length) suggest the use of random access memory (RAM). A time of 500 ns allows for 2 cycles of memory so that the required data flows can be accomplished by RAM. FIG. 10 illustrates the design of a RAM delay unit and switches. Data goes into the butterfly unit during the first memory cycle and outputs on the second. The switch on the left is in a high impedance state when the RAM is in the read cycle. FIGS. 11A and 11B give an example of how the RAM and switches can accomplish the data flow of FIGS. 9A-9D. More specifically, in FIG. 11A data, as represented by the broad arrows, is provided to the butterfly unit from the RAM delay unit and data input, and the computations are completed. After completion, FIG. 11B illustrates how the computed data is passed from the butterfly unit to the RAM delay unit and the data output. Data stored in the RAM delay unit is held for a predetermined period of time, and then read out for the next stage of the calculations.

Figure 12:
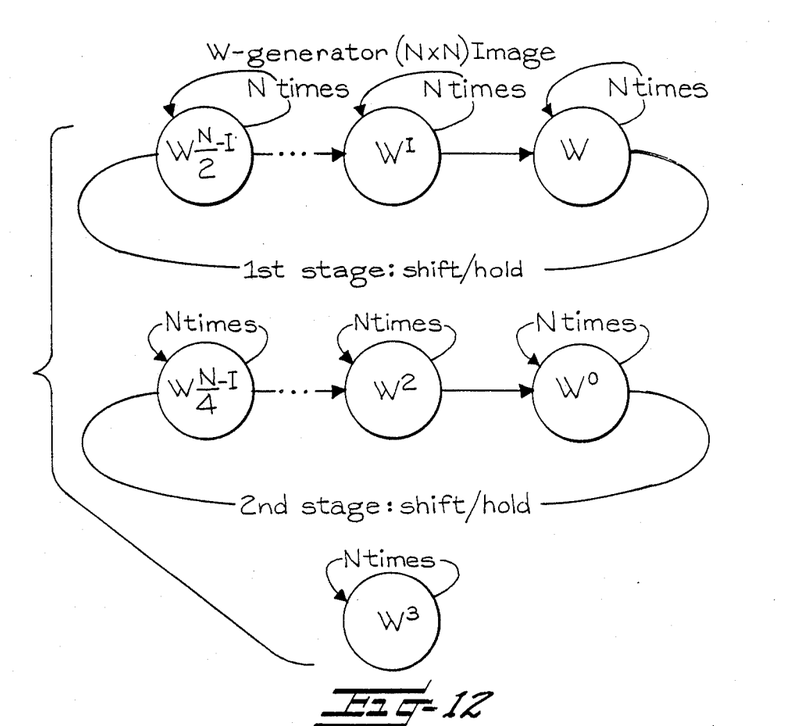
FIG. 12 is a schematic block diagram illustrating control methods for holding or shifting the data of twiddle factors.

The third component of the butterfly unit is the W table or Twiddle Factor Generator 24. The purpose of this component is to provide a unique W for each arithmetic operation of the butterfly unit. As reflected in equation (1) and the legends for FIGS. 4 and 6, W is a complex number, and it changes for each stage of the computations. The necessary quantities W are preferably calculated in advance and the entire table (2× word length ×N/2 bits) is stored in a custom static variable length shift register chip. Another primary feature of this chip is possible delay lengths of $2^i$ and the ability to either shift data or hold it in place, as shown in FIG. 12. Based on FIG. 4, the chip should have the capability of holding data N cycles before it makes any shift, or should have the capability of continuously shifting the data N cycles, as shown in FIG. 12.

A scheme for rasterizing the two-dimensional Fast Fourier Transform (2DFFT) with size NxN is presented. Accordingly, this invention presents a novel 2DFFT pipelined method with 2logN processors. The proposed architecture avoids the matrix transpose problem which is required as reported in most literature. The unique feature of the architecture is that the data can be continuously driven into the arithmetic processors in a pipelined fashion without using the corner-tuning mechanism. It is specially devised for the real-time applications if both the input and output devices are raster scan devices. The control of the proposed architecture is very simple and can be generated by a binary counter, as illustrated in FIG. 5. If a pipelining mechanism is used in the butterfly unit the data flow paths are as illustrated in FIGS. 9A-9D. If the delay line is implemented using RAM, the data flow paths are as illustrated in FIGS. 11A and 11B.

Real-time computational requirements based on this architecture for various image sizes are discussed. The chip implementation for the size 1024×1024 is realizable using the state of art CMOS technology.

That which is claimed is:

1. A method of processing data to obtain a Fourier transform of data presented in a two dimensional format, the method comprising the steps of:
   (a) defining an N by N matrix of data;
   (b) rasterizing the data from one of all columns or all rows of the defined matrix into a serial string of $N^2$ data elements;
   (c) performing a computational Fourier transform operation on the serial string of rasterized data to generate a first transformed data set; and
   (d) performing a computational Fourier transform operation directly on the first transformed data set to generate a second transformed data set in a one-dimensional serial string of data representing a form of the data presented in a two dimensional format.

2. The method of claim 1 wherein the step of rasterizing the data from one of all columns or all rows of the matrix comprises reading each word of data from each of said columns or rows to form a one dimensional linear array of the data.

3. The method of claim 1 wherein the step of rasterizing the data from one of all columns or all rows of the matrix comprises reading each word of data from each of said columns or rows to form a one dimensional linear array of the data.

4. The method of claim 1 wherein the step of performing a Fourier transform on the serial string of data or the first transformed data set comprises performing a Fourier transform taken from the group comprising: Cooley-Tukey technique or Sande-Tukey technique.

5. The method of claim 1 wherein the step of performing a Fourier transform on the serial string of data or the first transformed data set further comprises generating a corresponding serial string of Fourier transforms of the first or second string of data.

6. The method of claim 1 further comprising the step of performing the steps sequentially and in real time.

7. The method of claim 1 wherein the step of performing a Fourier transform on the serial string of data or the first transformed data set comprises performing at least one butterfly operation.

8. The method of claim 1 wherein the step of performing a Fourier transform on the serial string of data or the first transformed data set comprises performing butterfly operations using 2logN processors.

9. The method of claim 1 wherein the step of performing a Fourier transform on the serial string of data or the first transformed data set comprises processing data by performing cascaded butterfly operations.

10. The method of claim 1 wherein the step of performing a Fourier transform on the serial string of data or the first transformed data set comprises delaying predetermined portions of the serial string of data for a predetermined time, and performing a butterfly operation on the delayed data and on non-delayed data.

11. The method of claim 10 wherein the step of performing a Fourier transform on the serial string of data or the first transformed data set comprises providing predetermined constant multiplication factors for the butterfly operation.

12. The method of claim 1 wherein the step of performing a Fourier transform on the serial string of data to generate a first transformed data set comprise performing a Fourier transform on the serial string of data to generate a first transformed data set in a serial string of data representing a form of the data presented in a two dimensional format.

13. The method of claim 1 wherein the step of performing a Fourier transform is performed on the serial string of rasterized data or the first transformed data set without corner tuning or transposing the rasterized data or transformed data.

14. Apparatus for processing data to obtain a Fourier transform of data presented in a two dimensional format, comprising:
   (a) means for defining an N by N matrix of data;
   (b) means for rasterizing the data from one of all columns or all rows of the defined matrix into a serial string of $N^2$ data elements;
   (c) means for performing a computational Fourier transform operation on the serial string of rasterized data to generate a first transformed dats set; and
   (d) means for performing a computational Fourier transform operation directly on the first transformed data set to generate a second transformed data set in a one-dimensional serial string of data representing a form of the data presented in a two dimensional format.

15. The apparatus claim 14 wherein the means for rasterizing the data from one of all columns or all rows of the matrix comprises means for reading each word of data from each of said columns or rows to form a one-dimensional linear array of the data.

16. The apparatus of claim 14 wherein the means for rasterizing the data from one of all columns or all rows of the matrix comprises means for reading each word of data from each of said columns or rows to form a one-dimensional linear array of the data.

17. The apparatus of claim 14 wherein the means for performing a Fourier transform on the serial string of data or the first transformed data set comprises means for performing a fast Fourier transform taken from the group comprising: Cooley-Tukey technique or Sande-Tukey technique.

18. The apparatus of claim 13 wherein the means for performing a Fourier transform on the serial string of data or the first transformed data set further comprising means for generating a corresponding serial string of Fourier transforms of the first or second string of data.

19. The apparatus of clim 13 further comprising means for performing the steps sequentially and in real time.

20. The apparatus of claim 14 wherein the means for performing a Fourier transform on the serial string of data or the first transformed data set comprises means for processing data by performing at least one butterfly operation.

21. The apparatus of claim 14 wherein the means for performing a Fourier transform on the serial string of data or the first transformed data set comprises 2logN processors for performing butterfly operations.

22. The apparatus of claim 21 wherein the means for processing data by performing a butterfly operation comprises means for processing data by performing a pipelined butterfly operation.

23. The apparatus of claim 14 wherein the means for performing a Fourier transform on the serial string of data or the first transformed data set comprises means for processing data by performing cascaded butterfly operations.

24. The apparatus of claim 14 wherein the means for performing a Fourier trnasform on the serial string of data or the first transformed data set comprises
  (a) means for delaying predetermined portions of the serial string of data for a predetermined time, and
  (b) means for performing a butterfly operation on the delayed data from the means for delaying and non-delayed data.

25. The apparatus of claim 24 further comprising means for providing predetermined constant multiplication factors for the butterfly operation.

26. The apparatus of claim 24 wherein the means for delaying comprises random access memory.

27. The apparatus of claim 14 wherein the means for performing a Fourier transform on the serial string of rasterized data comprises means for performing a Fourier transform on the serial string of rasterized data or first transformed data set without corner tuning or transposing the rasterized data or transformed data.

* * * * *

UNITED STATES PATENT AND TRADEMARK OFFICE
CERTIFICATE OF CORRECTION

PATENT NO. : 4,821,224

DATED : April 11, 1989

INVENTOR(S) : Wentai Liu, William T. Krakow, Thomas A. Hughes, Jr.

It is certified that error appears in the above-identified patent and that said Letters Patent is hereby corrected as shown below:

Col. 3, line 16, insert -- a -- before "pipelined"
Col. 4, line 11, "paralle" should be -- parallel --
Col. 6, line 16, after "4", insert -- (below) --

Col. 6, line 28, delete "Table 4 (below)"
Col. 6, line 45, "8" should be -- 7 --
Col. 7, line 67, "new" should be -- now --
Col. 9, line 66, "comprise" should be -- comprises --
Col. 10, line 18, "dats" should be -- data --
Col. 10, line 42, "13" should be -- 14 --
Col. 10, line 47, "clim 13" should be -- claim 14 --
Col. 11, line 2, "trnasform" should be -- transform --

Signed and Sealed this

Twenty-seventh Day of February, 1990

*Attest:*

JEFFREY M. SAMUELS

*Attesting Officer*   *Acting Commissioner of Patents and Trademarks*